United States Patent [19]

Hazama et al.

[11] Patent Number: 5,394,213
[45] Date of Patent: Feb. 28, 1995

[54] EASY-FILM-LOADING CAMERA

[75] Inventors: Kiyoaki Hazama; Takemi Miyazaki; Noriyuki Kaedeoka, all of Hachioji, Japan

[73] Assignee: Konica Corporation, Tokyo, Japan

[21] Appl. No.: 183,421

[22] Filed: Jan. 19, 1994

[30] Foreign Application Priority Data

Jan. 25, 1993 [JP] Japan ............................. 5-005106[U]

[51] Int. Cl.$^6$ .............................................. G03B 17/02
[52] U.S. Cl. ................................................... 354/288
[58] Field of Search ................................. 354/275, 288

[56] References Cited

U.S. PATENT DOCUMENTS 5,142,316  8/1992  Tanii et al. ...................... 354/288 X
5,250,972 10/1993  Hirohata et al. ................... 354/288

FOREIGN PATENT DOCUMENTS

59-53348  4/1984  Japan .
59-77134  5/1984  Japan .

Primary Examiner—Howard B. Blankenship
Attorney, Agent, or Firm—Finnegan, Henderson, Farabow, Garrett & Dunner

[57] ABSTRACT

A camera for accommodating a film cartridge which includes a film being rolled on the axis in a lightproof condition. The camera includes; a cartridge chamber for receiving the film cartridge in the axial direction; an ejecting member for ejecting the film cartridge which is placed in the cartridge chamber; and a positioning member for positioning the film cartridge at a fixed position in the cartridge chamber; wherein the positioning member includes an engaging claw which is interchangeable between a first condition that the engaging claw is movable by a pressing force of the film cartridge while the film cartridge is inserted into the cartridge chamber by an operator, and a second condition, after insertion of the film cartridge into the cartridge chamber is completed, that the engaging claw is pushed by a spring member so that the engaging claw engages with a side end of the film cartridge.

4 Claims, 10 Drawing Sheets

CARTRIDGE
POSITIONING
MEANS A

EASY-FILM-LOADING CAMERA

BACKGROUND OF THE INVENTION

The present invention relates to an easy-film-loading camera in which a cartridge with lightproof accommodation of a film is loaded in a cartridge chamber, and also relates to a packaged film accommodating a photographic film therein.

There is provided an easy-film-loading camera for loading a film easily in which a cartridge with lightproof accommodation of a film is loaded into a cartridge chamber through a cartridge entrance when it is pushed in the axial direction. This type camera for loading a film easily is disclosed, for example, in Japanese Patent Publication Open to Public Inspection Nos. 53348/1984 and 77134/1984. In the camera disclosed in Japanese Patent Publication Open to Public Inspection No. 53348/1984, a cartridge ejection member for ejecting a cartridge from a cartridge chamber is engaged with an engaging lever, and when this engaging lever is released, the cartridge is ejected by the action of the cartridge ejection member. In the camera disclosed in Japanese Patent Publication Open to Public Inspection No. 77134/1984, a cartridge is loaded into and ejected from a cartridge chamber while a cartridge ejection member is linked with a chamber cover.

In the aforementioned easy-film-loading camera, the cartridge ejection member is operated only for ejecting the cartridge from the cartridge chamber, and a means for holding the cartridge at a predetermined position in the cartridge chamber is not provided. Consequently, in the case where a cartridge having a long film tongue is loaded into the camera, the long film tongue is placed between the outer guide rails in such a manner that an exposure frame is covered with the film tongue. However, in the case where a cartridge having a short film-tongue is loaded into the camera, it is impossible to place the film tongue on the exposure frame because the film tongue is short. Accordingly, unless the cartridge is loaded at a predetermined position, the film is disengaged from the outer guide rails and inserted between the outside rails and the pressure plate in the case of automatic loading. Therefore, the film can not be accurately set in the exposure frame.

In some cases, even when the film tongue portion is located in the exposure frame in the case of cartridge loading, the film tongue portion falls into the exposure frame due to the curl of the film, so that the cartridge can not be appropriately set in the cartridge chamber.

In view of the above problems, the present invention has been achieved. It is an object of the present invention to provide an easy-film-loading camera characterized in that: a cartridge is positively held at a predetermined position in a cartridge chamber by a simple structure; and a film tongue portion is set so that it can positively pass through an exposure frame. In this way, a packaged film can be appropriately loaded into the camera.

SUMMARY OF THE INVENTION

In order to solve the above problems, an easy-film-loading camera is described in an embodiment of the present invention, in which a cartridge with lightproof accommodation of a film therein is inserted into a cartridge chamber in the axial direction through a cartridge entrance provided in a camera body. The easy-film-loading camera of this embodiment includes: an ejection spring which pushes the cartridge loaded in the cartridge chamber in an ejecting direction; and a cartridge positioning means protruded from an end of the cartridge entrance, the cartridge positioning means being pushed by an outer periphery of the side of the cartridge when the cartridge is loaded into the camera so that the cartridge positioning means is withdrawn from the cartridge entrance while resisting a spring force, and the cartridge positioning means positioning the cartridge by engaging with an upper side end portion of the cartridge after the cartridge has been loaded into the camera.

Further, the easy-film-loading camera of the present invention is characterized in that: the cartridge positioning means is withdrawn from the cartridge entrance when a chamber cover opening and closing; the cartridge entrance is closed, so that the cartridge positioning means is released from an side end portion of the cartridge; and the cartridge is vertically positioned when a rib formed on the chamber cover comes into contact with the end portion of the cartridge.

The easy-film-loading camera of the present invention includes a release means by which the chamber cover opening and closing the cartridge entrance is changed from a closing condition to an opening condition, wherein the cartridge positioning means is withdrawn from the cartridge entrance in accordance with the operation of this release means so that the engagement with the end portion of the cartridge can be released.

The easy-film-loading camera of the present invention is characterized in that: the cartridge positioning means is disengaged from the cartridge before a closing condition of the chamber cover is released.

The present invention is to provide a packaged film for photography including: a film, in which both end portions of a leading portion are protruded with respect to the center of the film; and a cartridge for accommodating the film in a light-tight condition, wherein a side end portion of at least one-of the protruded film end portions is tapered.

In the easy-film-loading camera of the present invention into which the packaged film is loaded, a tapered portion, the level on the exposure frame side of which is low and the level of which is continuously increased to a level of the guide rail surface, is formed on an inner guide rail located distant from the cartridge entrance, wherein the inner guide rail is one of the two inner guide rails disposed on both sides of the exposure frame.

Due to the structure described above, the cartridge positioning means is engaged with an end of the cartridge at a predetermined position, and the cartridge is positively held by the ejection spring and the cartridge positioning means at a predetermined position.

When the release means is operated, the cartridge positioning means is withdrawn from the cartridge entrance, so that the engagement with the end portion of the cartridge is released, and the cartridge can be ejected from the cartridge chamber.

Further, by the action of the tapered portions of the film and camera, the film can be positively loaded into the camera.

BRIEF DESCRIPTION OF THE DRAWINGS

In the detailed description of the preferred embodiment of the present invention, reference is made to the accompanying drawings in which.

DETAILED DESCRIPTION OF THE INVENTION

Next, with reference to the accompanying drawings, an embodiment of the easy-film-loading camera of the present invention will be described as follows.

A camera body 1 of this easy-film-loading camera is provided with a rear cover 2 which can be opened and closed. In the camera body 1, a take-up reel chamber 4 is formed on one side of an exposure frame 3, and a cartridge chamber 5 is formed on the other side. In this take-up reel chamber 4, a take-up reel 6 is rotatably provided. When an engagement claw 6a of the take-up reel 6 is engaged with a perforation 8a of a film 8 provided in a cartridge 7, the film 8 can be wound up. A cartridge entrance 9 is formed in a portion of the camera body 1 opposed to the cartridge chamber 5. This cartridge entrance 9 can be opened and closed when a chamber cover 10 is activated. In the inner part of the cartridge chamber 5, an ejection spring 11 is provided which pushes the loaded cartridge 7 to the ejecting direction. Accordingly, the cartridge 7 is always pushed by the ejecting spring 11 to a direction so that the cartridge 7 can be taken out. Under the condition that the chamber cover 10 is closed, the cartridge 7 comes into pressure contact with a rib 10b provided inside the chamber cover 10.

To this type easy-film-loading camera, the presently used packaged photographic film can not be applied, in which a long fore end of the film is extended from the cartridge. For this reason, the present applicant applied for a patent of a new packaged film illustrated in FIG. 9 on Aug. 24, 1992, wherein the title of the application is "Packaged film for photography". This packaged film F for photography includes: a film 8 having a fore end portion 8c in which both end portions 8d are protruded with respect to a center 8e; and a cartridge 7 which accommodates the film 8 under a light-tight condition.

In the camera body 1 of the easy-film-loading camera, a hook 12 is rotatably provided around a pin 13 at a position close to the cartridge entrance 9. This hook 12 is pushed by a spring 14 so that the hook 12 can be contacted with a stopper 15. This hook 12 is provided with a protrusion 12a and a claw portion 12b. Under the condition that the chamber cover 10 is opened, the hook 12 comes into contact with the stopper 15. Under this condition, the claw portion 12b faces the cartridge entrance 9. Consequently, when the cartridge 7 faces the cartridge entrance 9 under the condition that the chamber cover 10 is opened, the cartridge 7 pushes the claw portion 12b of the hook 12, resisting a force generated by the spring 14, so that the hook 12 is withdrawn. Accordingly, the cartridge 7 is pushed in the axial direction and loaded in the cartridge chamber 5. This hook 12 composes the cartridge engagement means A. The cartridge engagement means A is withdrawn when the cartridge 7 facing the cartridge entrance 9 is loaded, and engaged with an end portion of the cartridge 7 which has been loaded into the cartridge chamber 5, resisting a force generated by the ejection spring 11. That is, the operation is carried out in the following manner: When the cartridge 7 is loaded into the cartridge chamber 5, the claw portion 12b of the hook 12 is disengaged from a side of the cartridge 7, and the hook 12 is pushed by the spring 14 and contacted with the stopper 15. Then, the claw portion 12b enters the cartridge entrance 9, and engages with the end portion of the cartridge 7. In this way, the cartridge 7 is positioned. Under this condition, the cartridge 7 is positively held by the action of the ejection spring 11 and the hook 12 at a predetermined position.

When the chamber cover 10 is closed, a withdrawal rib 10a of the chamber cover 10 pushes the protrusion 12a of the hook 12, so that the hook 12 is withdrawn resisting a force generated by the spring 14. At the same time, the engagement rib 10b of the chamber cover 10 faces the cartridge entrance 9. When the hook 12 is withdrawn and disengaged from the end portion of the cartridge 7, the engagement rib 10b of the chamber cover 10 comes into pressure contact with the end portion of the cartridge 7. While the claw portion 12b of the hook 12 is engaged with the end portion of the cartridge 7, it is not engaged with the engagement rib 10b of the chamber cover 10, and the chamber cover 10 is closed.

As described above, when the chamber cover 10 is closed so as to close the cartridge entrance 9, the hook 12 of the cartridge engagement means A is withdrawn from the cartridge entrance 9, so that the hook 12 is disengaged from the end portion of the cartridge 7. Instead of that, the rib 10b of the chamber cover 10 is engaged with the end portion of the cartridge 7, and the cartridge 7 is positively held by the help of the ejection spring 11 at a predetermined position.

A pair of inner guide rails 16, 17 and a pair of outer guide rails 18, 19 are provided on both sides of the exposure frame 3 in a vertical direction. A distance between these outer guide rails 18, 19 is the same as the film width L1. The level of the outer guide rails 18, 19 is formed higher than that of the inner guide rail 16, 17, and the pressure plate 21 held on the rear cover 2 through a pressure plate spring 20 comes into pressure contact with the pair of outer guide rails 18, 19. Due to the foregoing, the film 8 is fed between the inner guide rail 16, 17 and the pressure plate 21 while the end portions 8b on both sides of the film 8 are guided by the outside rails 18, 19.

On the film cartridge chamber side of the outer guide rails 18, 19, tapered portions 18a, 19a are provided, which are formed in such a manner that a distance between the tapered portions is longer than the film width L1, and the distance gradually becomes the same as the film width L1 when they come close to the exposure frame 3. The distance between the tapered portions 18a, 19a becomes the same as the film width L1 when they approach the exposure frame 3 from the end portions 5a, 5b of the cartridge chamber 5. In this example, the tapered portions 18a, 19a are formed on both outer guide rails 18, 19, however, only the tapered portion 19a may be formed on the outer guide rail 19.

Figure 1:
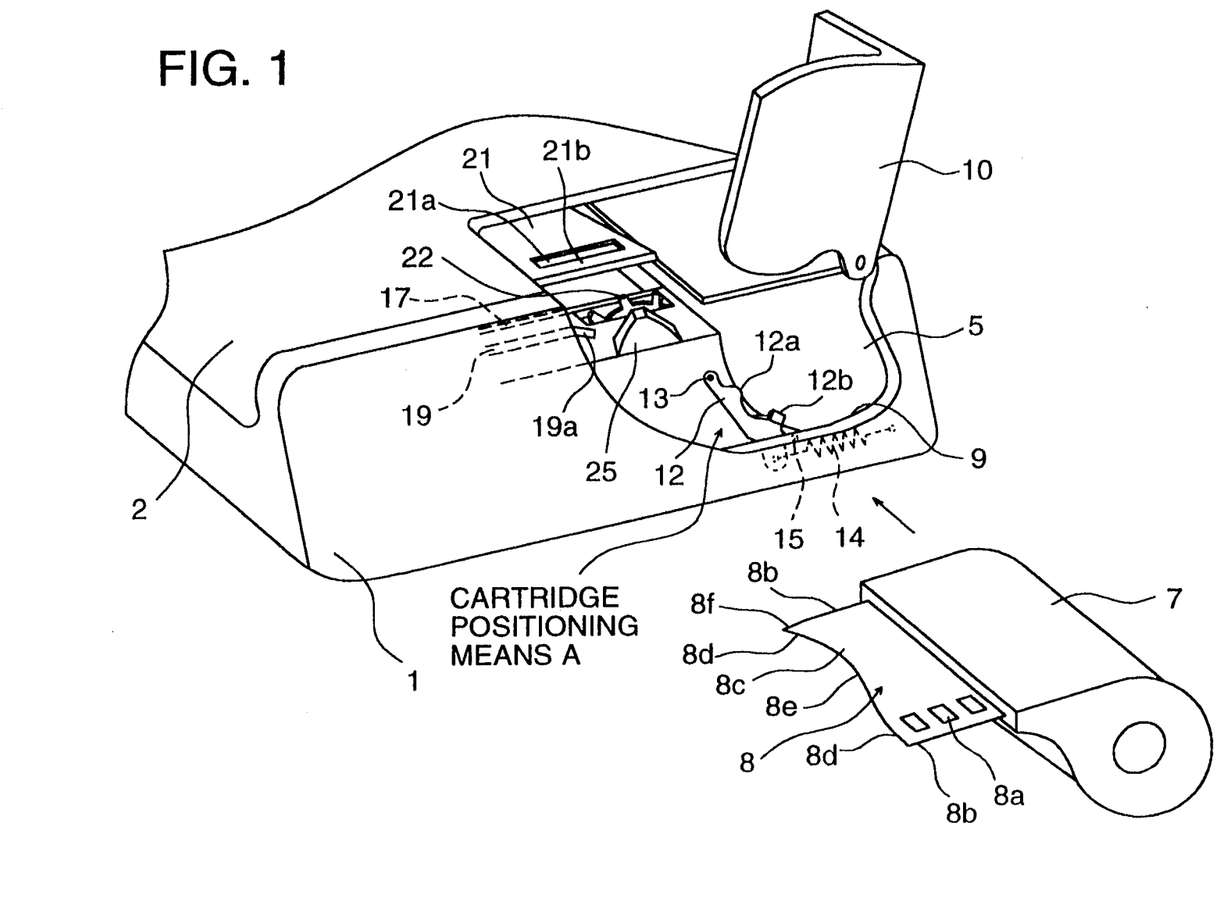
FIG. 1 is a perspective view showing a condition in which a cartridge is loaded into an easy-film-loading camera.
Figure 2:
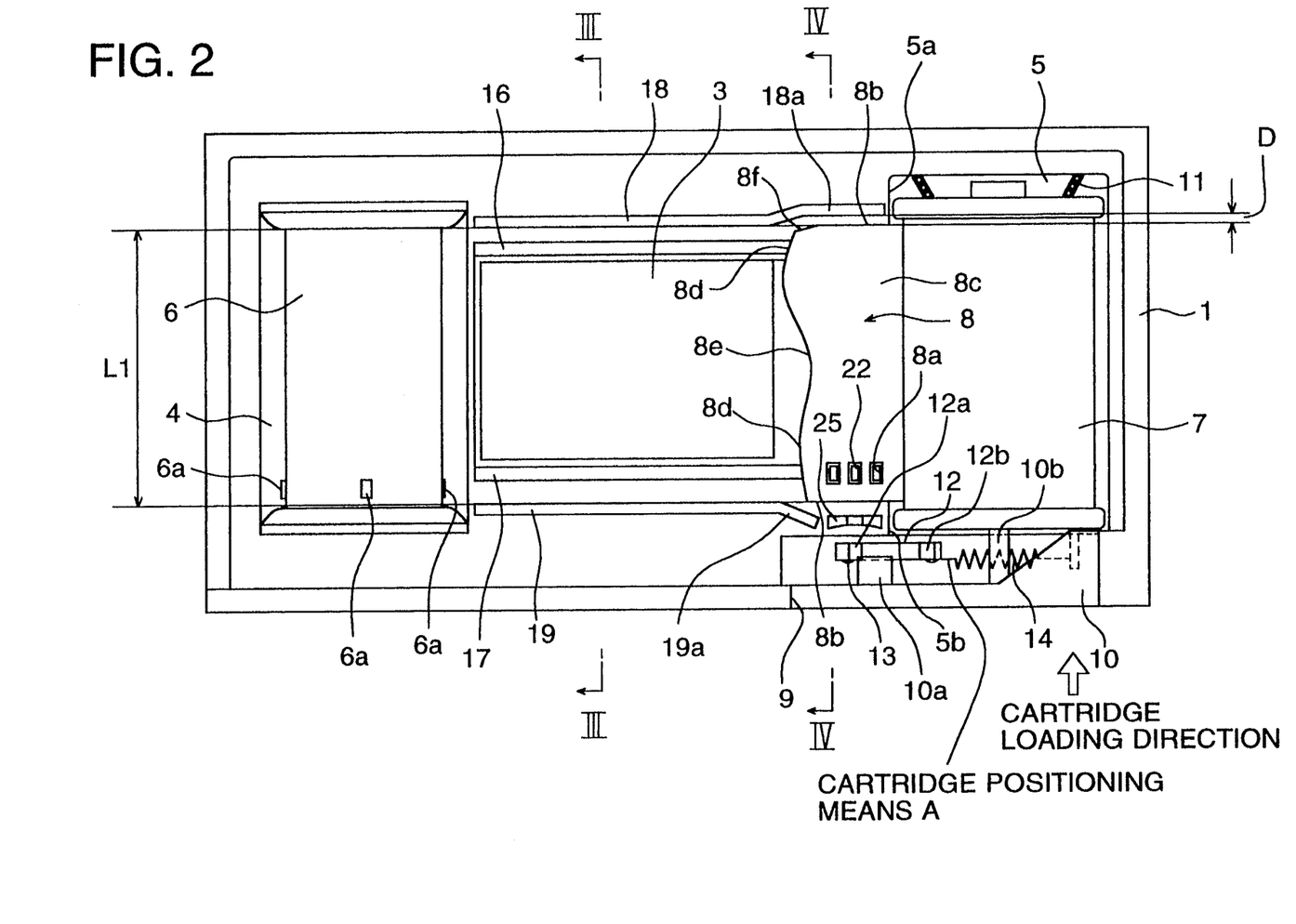
FIG. 2 is a plan view showing a condition in which the cartridge is loaded into the easy-film-loading camera.
Figure 3:
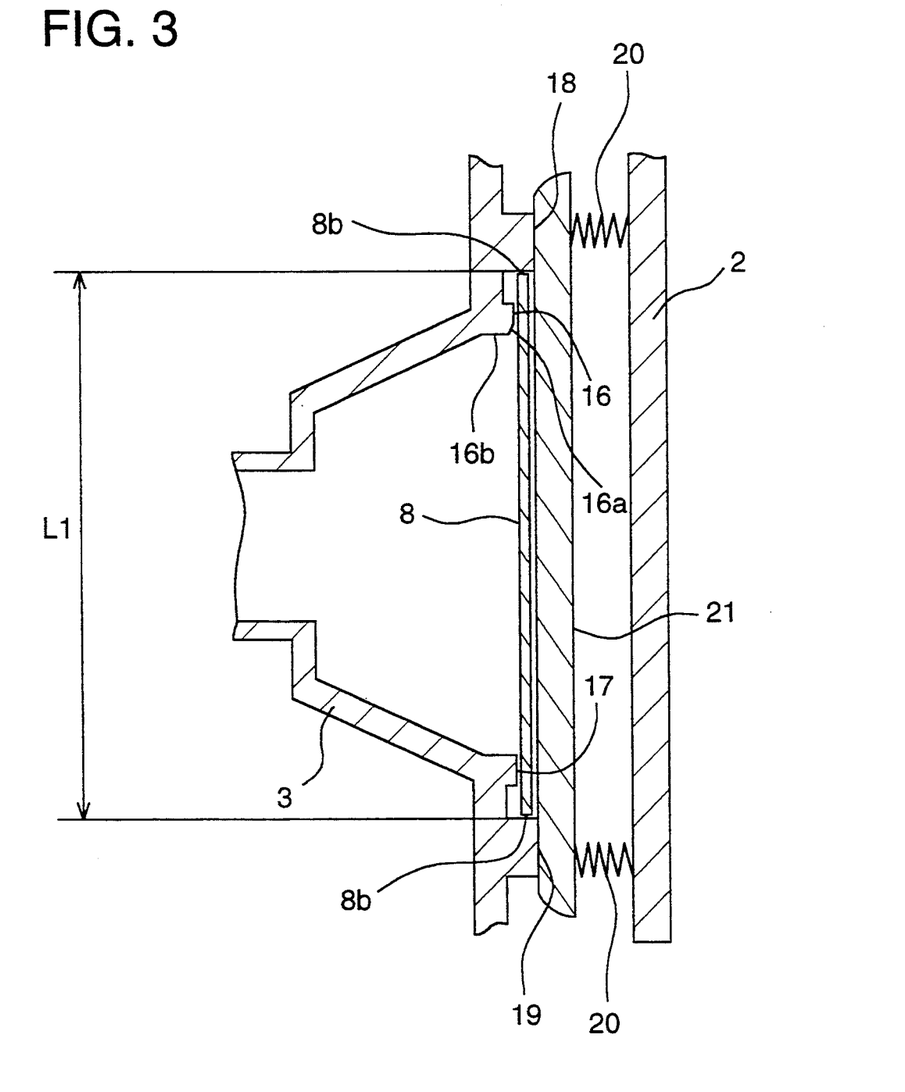
FIG. 3 is a sectional view taken on line III—III in FIG.
Figure 4:
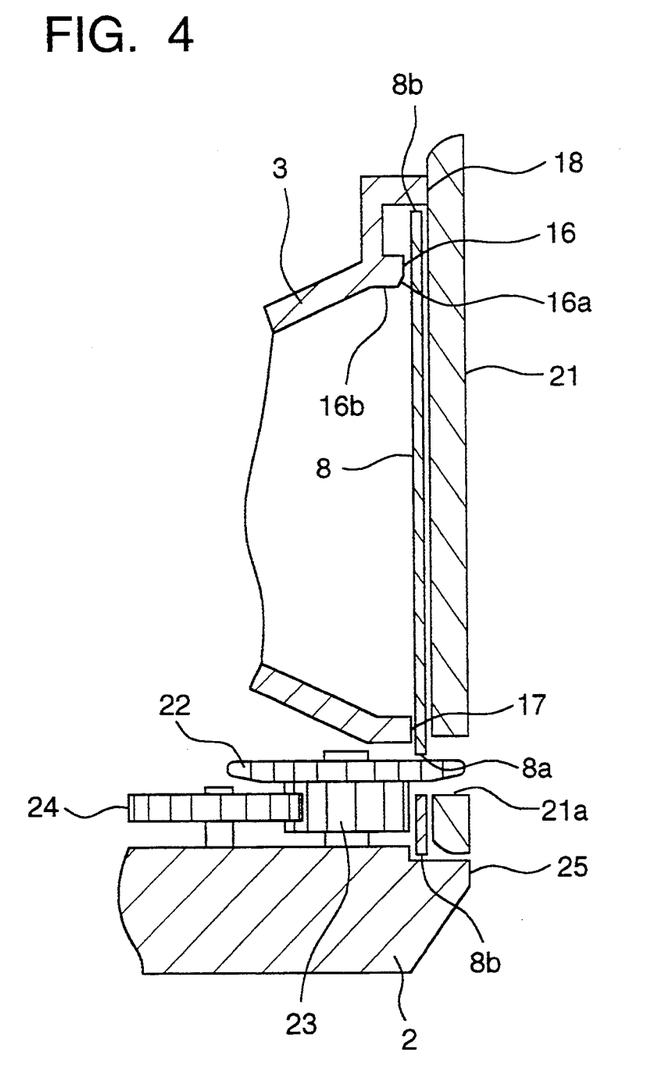
FIG. 4 is a sectional view taken on line IV—IV in FIG. 2.
Figure 5:
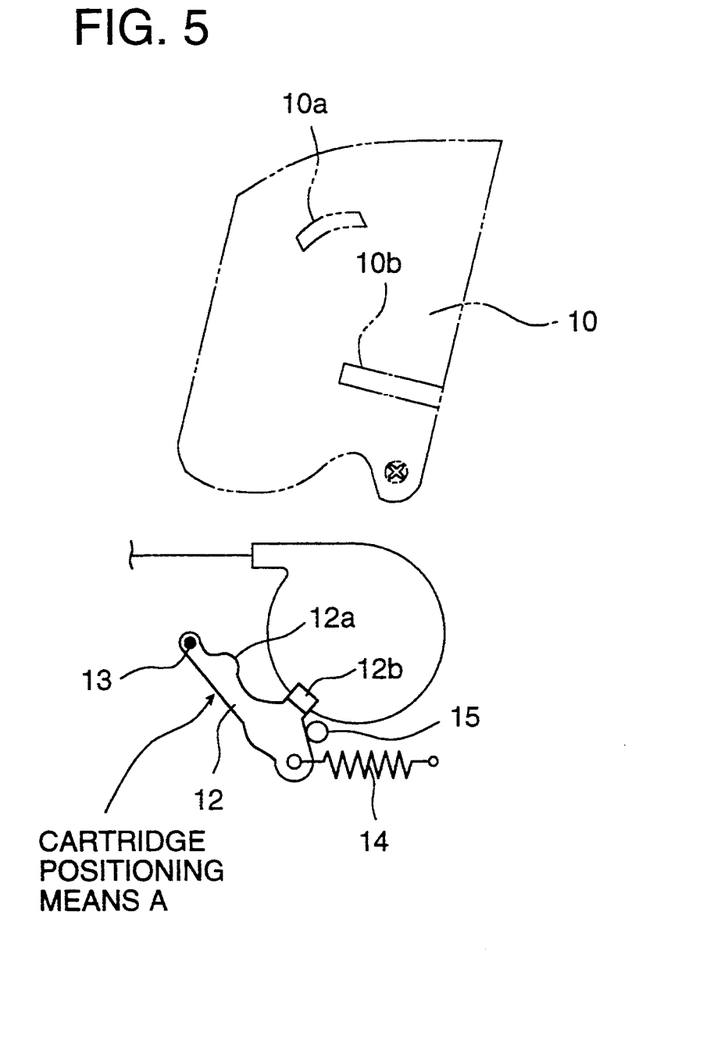
FIG. 5 is a side view showing an opening condition of a chamber cover.
Figure 6:
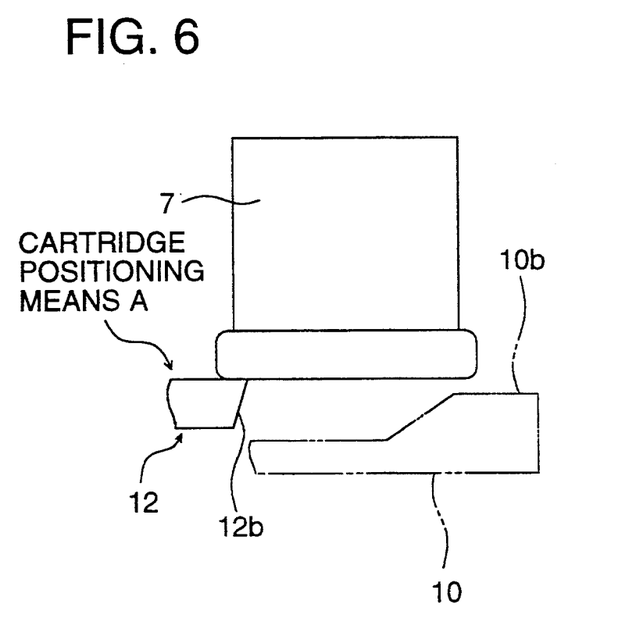
FIG. 6 is a plan view showing an opening condition of the chamber cover.
Figure 7:
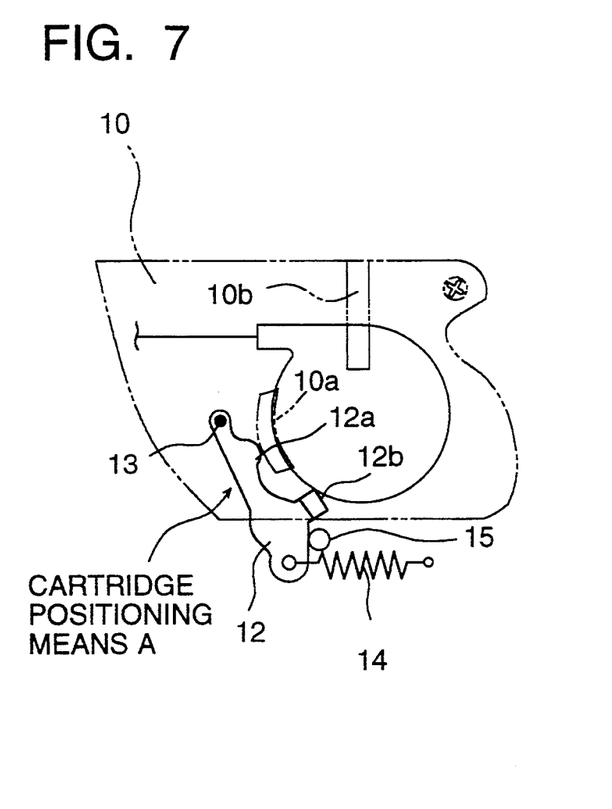
FIG. 7 is a side view showing a closing condition of the chamber cover.
Figure 8:
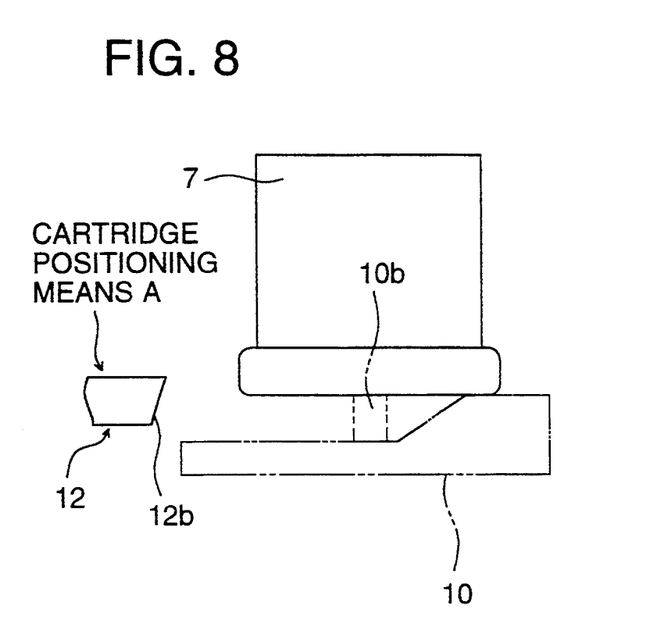
FIG. 8 is a plan view showing an opening condition of the chamber cover.
Figure 9:
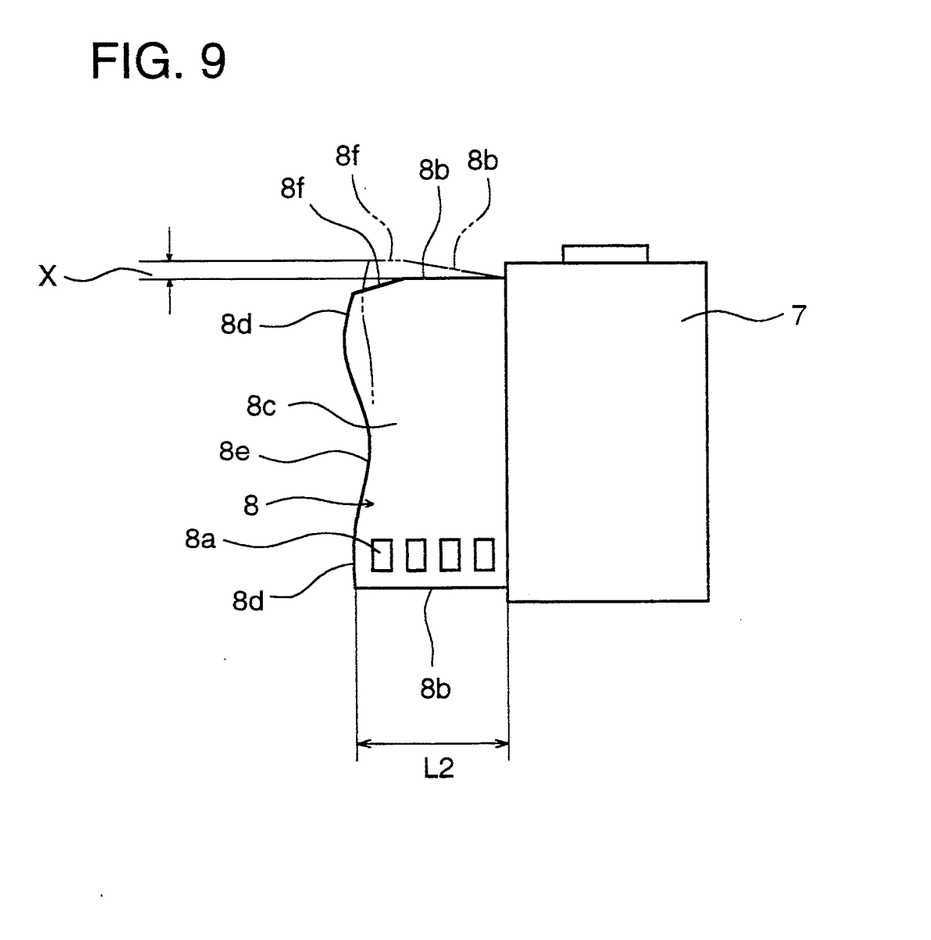
FIG. 9 is a side view of the cartridge.

As illustrated in FIG. 9, when the length L2 of the fore end portion 8c of the film 8 is determined to be 16.6 mm, the maximum deviation X of the fore end portion 8c of the film 8 is 0.6 mm, which can be determined from the result of a sampling measurement test. Therefore, the relief D of the tapered portions 18a, 19a of the outer guide rails 18, 19 are preferably not less than 0.6 mm.

A sprocket 22 is provided in the proximity of the cartridge chamber side end portion of the inner guide rail 17, and perforations 8a are engaged with this sprocket 22. A gear 23 is mounted on the same shaft as that of the sprocket 22. This gear 23 is meshed with a drive gear 24. When this drive gear 24 is driven, the sprocket 22 is rotated through the gear 23. Due to the foregoing, the film 8 can be fed. A tapered protrusion 25 is provided on the outside of the sprocket 22. When the film 8 is loaded into the cartridge chamber 5, this protrusion pushes the cartridge 7 in the axial direction, so that the fore end portion 8c of the film 8 is not caught by the sprocket 22. On the pressure plate 21, a relief window portion 21a is formed in a portion which faces the sprocket 22. When the cartridge 7 is loaded, an end portion 21b of the pressure plate 21 is raised, so that the fore end portion 8c of the film 8 is not caught by the end portion 21b of the pressure plate 21.

In this connection, the film 8 is unavoidably curled in the manufacturing process. In the case where the fore end portion 8c of the film 8 is not extended to the exposure frame 3 when the cartridge 7 is loaded, no problems are caused. However, in the case where the fore end portion 8c of the film 8 is extended to the exposure frame 3 from the cartridge 7, the fore end portion 8c of the film 8 falls into the exposure frame 3 due to the curl of the film 8. Therefore, the side end portion 8b is caught by the end surface of the exposure frame 3, that is, the side end portion 8b is caught by the side end surface 16b of the inner guide rail 16, so that the film 8 can not be appropriately loaded. In order to solve the above problems, a tapered portion 8f is provided in the side end 8b of the fore end portion 8c of the film, wherein the tapered portion 8f is formed in such a manner that the width of the tapered portion 8f is narrow on the fore end side and becomes the same as the width of the film as it advances to the film cartridge side. Also, a tapered portion 16a is provided on the inner guide rail 16 of the camera body 1 in such a manner that the level of the tapered portion 16a is low on the side end surface 16b and becomes higher as it is separate from the exposure frame 3. In this case, the tapered portion 8f on the film side is provided on a side opposite to the perforations 8a, however, it may be separated on a side of perforations depending upon the arrangement of the cartridge chamber 5. Of course, it is most appropriate that the tapered portions 8f are provided on both sides of the film. As described above, the tapered portions are provided both in the film 8 and the camera body 1. Accordingly, even when the fore end portion 8c of the film falls in the exposure frame 3 due to the curl of the film, the fore end portion 8c of the film is pushed out onto the guide rail side by the action of both tapered portions 8f, 16a, so that the fore end portion 8c of the film is fed on the inner rail 16 and positioned appropriately. The effect is not necessarily provided only when both the tapered portion 8f on the film side and the tapered portion 16a on the camera side are formed, but when one of them is formed, sufficient effect can be provided. Of course, when both of them are formed, the effect can be further increased.

Consequently, the film 8 can be accurately set on the exposure frame 3 in the following manner: The chamber cover 10 is opened, and the cartridge 7 is pushed into the cartridge chamber 5 in the axial direction through the cartridge entrance 9 opened on the camera body 1. Then, the sprocket 22 is rotated for loading the film automatically, and both side end portions 8b of the fore end portion 8c of the film 8 are guided by the tapered portions 18a, 19a of the outer guide rails 18, 19. In this way, the film 8 can be set on the exposure frame 3.

Figure 10:
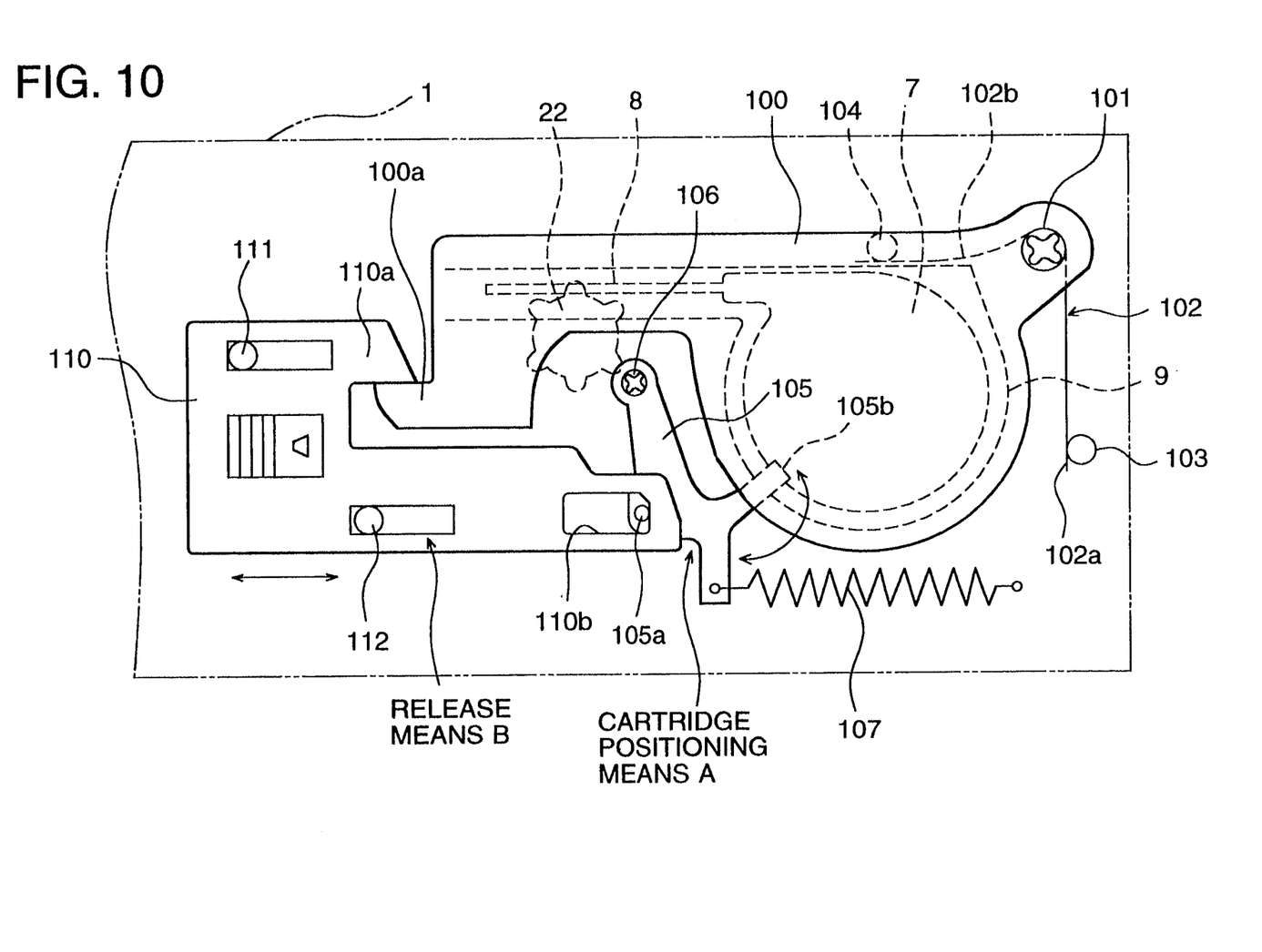
FIG. 10 is a view showing a condition of cartridge loading in the easy-film-loading camera.

Next, with reference to FIG. 10, the second example of the easy-film-loading camera will be explained below. FIG. 10 is a schematic illustration showing a condition in which a cartridge is loaded in an easy-film-loading camera. Like parts in each of the drawings FIGS. 1 to 10 are identified by the same reference character, and the explanations are omitted here.

In this second example, the cartridge 7 is pushed in the axial direction through the cartridge entrance 9 opened on the camera body 1 so as to load the cartridge 7 into the cartridge chamber. A chamber cover 100 to open and close the cartridge entrance 9 is rotatably provided on the camera body 1, wherein the chamber cover 100 can be rotated around a screw 101. An opening and closing spring 102 is attached to the screw 101, and one end 102a of this opening and closing spring 102 is engaged with a pin 103 of the camera body 1, and the other end 102b is engaged with a pin 104 on the chamber cover 100. Therefore, the chamber cover 100 is always pushed by the opening and closing spring 102 so as to be opened.

A claw portion 100a of this chamber cover 100 is engaged with an engagement portion 110a of an opening and closing lever 110. Under this condition, the chamber cover 100 closes the cartridge entrance 9. This opening and closing lever 110 is slidably provided on the camera body 1 being guided by guide shafts 111 and 112. When this opening and closing lever 110 is pulled, an engagement between the claw portion 100a of the chamber cover 100 and the engagement portion 110a of the opening and closing lever 110 is released, so that the chamber cover 100 can be opened and closed. This opening and closing lever 110 composes the release means B for releasing a closing condition of the chamber cover 100 to close the cartridge entrance 9.

A stopper window 110b is formed in this opening and closing lever 110. A stopper pin 105a of the hook 105 is engaged with this stopper window 110b. A claw portion 105b of this hook 105 is disposed in such a manner that the claw portion 105b faces the cartridge entrance 9, and this hook 105 is ratably supported by the camera body 1 through a screw 106. This hook 105 is always pushed by a spring 107 so that the engagement claw 105a can be engaged with an end portion of the cartridge 7. In this way, the hook 105 composes the cartridge engagement means A.

When the cartridge 7 is loaded, the claw portion 105b of this hook 105 is pushed and withdrawn. When the claw portion 105b of the hook 105 is disengaged from the side portion of the cartridge 7 which has been loaded resisting a force of the ejection spring, the claw portion 105b is engaged with an end portion of the cartridge 7, so that the cartridge 7 is held at a predetermined position, resisting the force of the ejection spring.

In the case where the chamber cover 100 is opened with the opening and closing lever 110, the opening and closing lever 110 is slid, and the stopper pin 105a of the hook 105 is pulled by the stopper window 110b. Due to the foregoing, the hook 105 is rotated, resisting a force of the spring 107, and the claw portion 105b is withdrawn from the cartridge entrance 9. At this time, before the claw portion 100a of the chamber cover 100 is released from the engagement portion 110a of the opening and closing lever 110, an engagement of the cartridge 7 conducted by the claw portion 105b of the hook 105 is released. For this reason, the engagement of the cartridge 7 is previously released, and the cartridge 7 is temporarily pressed against the chamber cover 100 by the force generated by the ejection spring. In this way, the chamber cover 100 is opened by the opening and closing lever 110, and the claw portion 105b of the hook 105 is withdrawn from the cartridge entrance 9, and the engagement with the end portion of the cartridge 7 is released, so that the cartridge 7 can be ejected from the cartridge chamber.

What is claimed is:

1. A camera for accommodating a film cartridge having an axis wherein a film is rolled on the axis in a lightproof condition, comprising:
    a cartridge chamber means for receiving said film cartridge in a direction of said axis of said film cartridge;
    an ejecting means for ejecting said film cartridge which is placed in said cartridge chamber means; and
    a positioning means for positioning said film cartridge at a predetermined position in said cartridge chamber means;
    wherein said positioning means includes an engaging member which is interchangeable between a first condition that said engaging member is movable by a pressing force of said film cartridge while said film cartridge is inserted into said cartridge chamber means, and a second condition, after insertion of said film cartridge into said cartridge chamber means is completed, that said engaging member is pushed by a spring member so that said engaging member engages with a side end of said film cartridge.

2. The camera of claim 1, further comprising:
    a chamber cover means for covering a cartridge entrance of said cartridge chamber;
    wherein said chamber cover means moves between an open position wherein said chamber cover means is released from said cartridge entrance so that said film cartridge is capable of being inserted into said cartridge chamber means, and a closed position wherein said cartridge entrance is covered with said chamber cover means; said engaging member is in a third condition that said engaging member is released from an engagement with said side end of said film cartridge when said chamber cover means is in said closed position; and said chamber cover means sets said film cartridge in said cartridge chamber to a predetermined position when said engaging member is in said third condition.

3. The camera of claim 1, further comprising:
    a chamber cover means for covering a cartridge entrance of said cartridge chamber; wherein said chamber cover means moves between an open position wherein said chamber cover means is released from said cartridge entrance so that said film cartridge is capable of being inserted into said cartridge chamber means, and a closed position wherein said cartridge entrance is covered with said chamber cover means; and
    a chamber cover releasing means for releasing said chamber cover means from said closed position to said open position;
    wherein said engaging member is in a third condition that said engaging member is released from an engagement with said side end of said film cartridge when said chamber cover means is released to said open position by said chamber cover releasing means.

4. The camera of claim 3, wherein said engaging member is set in said third condition before said chamber cover releasing means releases said chamber cover from said closed position to said open position.

* * * * *